E. SCHALK.
Refining Petroleum and other Oils.
No. 146,405.　　　　　　　　　　Patented Jan. 13, 1874.
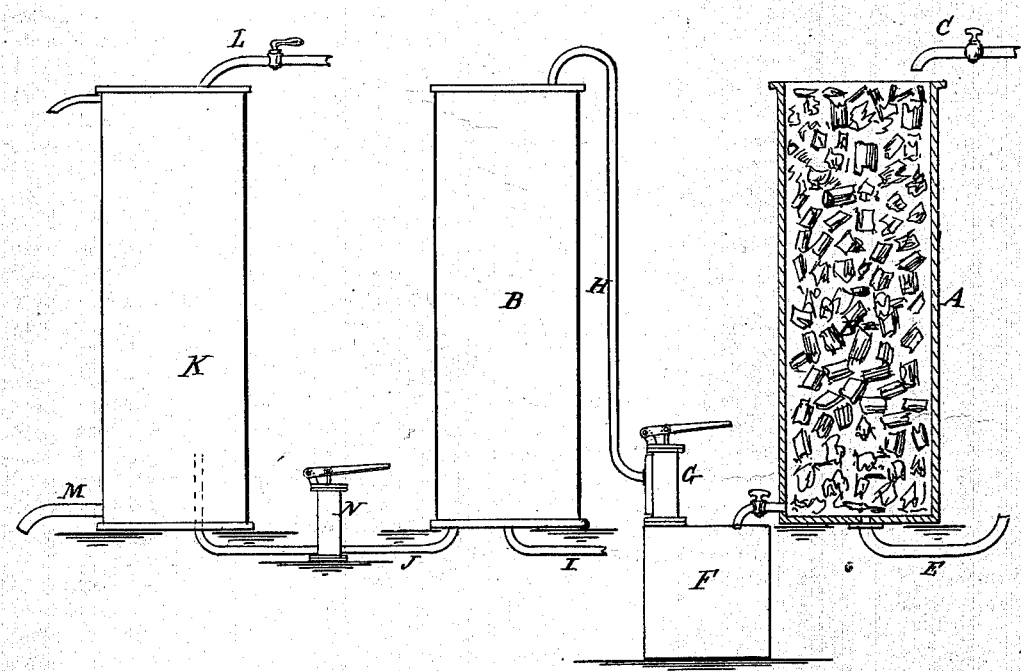

UNITED STATES PATENT OFFICE.

EMIL SCHALK, OF NEW YORK, N. Y.

IMPROVEMENT IN REFINING PETROLEUM AND OTHER OILS.

Specification forming part of Letters Patent No. 146,405, dated January 13, 1874; application filed November 8, 1873.

*To all whom it may concern:*

Be it known that I, EMIL SCHALK, of the city, county, and State of New York, have invented a new and useful Improvement in Refining Petroleum, of which the following is a specification:

In refining petroleum the product of distillation has up to this time been first treated with sulphuric acid, ($SO^3$,) the acid then being washed out with water, and the product next treated with caustic soda, or the ammonia of commerce.

I now propose to use sulphurous acid, ($SO^2$,) either gaseous or dissolved in water, for the first treatment, instead of the sulphuric acid, and for the second treatment I use ammonia-gas instead of the caustic soda or ammonia of commerce; and I also propose to use these both in the common intermittent process, in which the oil is treated in batches in a single tank, and in the continuous process described in the patent granted to me December 3, 1872, No. 133,598, either using the same apparatus described therein, with the exception of larger conduits for conducting the gases to the agitators, or the following: First, a vertical cylinder lined with lead or iron, and according to the amount of petroleum to be treated, from twenty to a hundred feet high, and two to ten feet broad, which I fill with empty bottles or glass, or earthen balls, to afford the largest possible amount of surface, over which balls or bottles I allow the oil to flow down slowly, and at the same time cause the sulphurous acid to enter at the bottom of the cylinder and pass up through in contact with the falling oil. From the bottom of this cylinder I draw the oil thus treated by the sulphurous acid into a tank to separate the clear oil from any oxidized portion, and then, by means of a pump or by air-pressure, bring the oil to a second cylinder, similar to the first, in which I subject it to the action of the ammonia-gas, in the same manner. Finally, in a third cylinder, similarly constructed, I cause the oil to ascend from the bottom upward by a pump or other means, and at the top I let in a stream of water in order to wash out any remaining acid or ammonia, or combination of the two. From this last cylinder I let the oil flow out in a continuous stream to the bleaching-tanks of the ordinary kind. The two gases will in some cases be used in combination instead of separately.

This operation is, like that described in my former patent above alluded to, continuous, and is, therefore, preferable to the common intermittent process, in which the oil is treated in batches, all of the different operations being performed in one tank; but, as before stated, I also propose to make use of these agents in the said intermittent process.

The drawing is a side elevation of the apparatus I now propose to employ for carrying out this new mode of treatment.

A represents the first cylinder; B, the bottoms or balls with which it is filled; C, the pipe for letting the distilled petroleum into the cylinder; E, the pipe for letting in the gas at the bottom; F, the tank into which the oil is drawn to be relieved of the oxidized part; G, the pump for elevating it into the second cylinder H, which also contains balls B. I is the pipe for letting the gas into the bottom of cylinder H; J, the pipe, and N a pump for forcing the oil from cylinder H into the last cylinder K at the bottom, also containing balls B. L is the pipe for letting in the water at the top for washing off the gases; and M is a pipe for drawing off the oil into the bleaching-tank. As soon as the first operation is completed in tank A, the oil is discharged from it, and the tank is filled anew, and the same with the others, thus making the operation continuous.

Having thus described my invention, I claim as new and desire to secure by Letters Patent—

1. The process of refining distilled petroleum by sulphurous acid, substantially as specified.

2. The process of refining distilled petroleum by ammonia-gas, substantially as specified.

EMIL SCHALK.

Witnesses:
A. P. THAYER,
T. B. MOSHER.